United States Patent [19]

Miller

[11] Patent Number: 5,066,061
[45] Date of Patent: Nov. 19, 1991

[54] SUNVISOR INCLUDING A METHOD AND ATTACHMENT MECHANISM FOR SECURING A COVERING TO THE SUNVISOR

[75] Inventor: Douglas C. Miller, Hersey, Mich.

[73] Assignee: Plasta Fiber Industries, Inc., Marlette, Mich.

[21] Appl. No.: 609,159

[22] Filed: Nov. 2, 1990

[51] Int. Cl.$^5$ ............................................. B60J 3/00
[52] U.S. Cl. .................................. 296/97.1; 29/453
[58] Field of Search ................... 296/97.1; 5/403, 402, 5/404–410; 29/453

[56] References Cited

U.S. PATENT DOCUMENTS

| | | | |
|---|---|---|---|
| 4,458,938 | 7/1984 | Viertel et al. | 296/97.1 |
| 4,711,483 | 12/1987 | Gulette et al. | 296/97.1 |
| 4,763,949 | 8/1988 | Robbins et al. | 296/97.1 |
| 4,867,500 | 9/1989 | Oosterbaan | 296/97.1 |

Primary Examiner—Robert R. Song
Attorney, Agent, or Firm—Brooks & Kushman

[57] ABSTRACT

Mechanism and method for attaching an outer covering to a plastic shell are provided wherein an attachment mechanism is attached or integral with an inner surface of a shell half. The attachment mechanism secures the covering to prevent the covering from working loose prior to and during closure of the upper and lower shell halves. The mechanism is designed to maintain adequate tension on the cover fabric, yet allow fabric to be pulled out as required by a peripheral fabric retention system. The mechanism further includes one or more members which flex to allow an elongated implement and fabric to enter, but which grabs and retains the fabric when the elongated implement is withdrawn prior to and upon closing of the upper and lower shell halves.

8 Claims, 3 Drawing Sheets

SUNVISOR INCLUDING A METHOD AND ATTACHMENT MECHANISM FOR SECURING A COVERING TO THE SUNVISOR

CROSS-REFERENCE TO RELATED APPLICATION

This application is related to application Ser. No. 570,864 filed Aug. 22, 1990, which is hereby incorporated by reference.

1. Technical Field

This invention relates to sunvisors and in particular to methods and mechanisms for securing coverings to sunvisors having an inner plastic shell.

2. Background of Invention

Many visors employed in automobiles are made of a plastic, shell-type core covered by a fabric which is colored and textured to match the interior upholstery of the vehicle.

The edge of many prior art visors is trimmed using a trim bead, and in some cases, the trim bead is attached to the edge of the core by stitching to the plastic material itself.

Because the covering fabrics of some plastic shell-type sunvisors tend to pull out and loosen or "bag" during or after shell closure, pre-edge folding and gluing or other methods of attaching the fabric to the sunvisor shell have been used.

For example, U.S. Pat. No. 4,494,789, discloses in one embodiment the use of a snap and ring or frame which compressively holds upholstery fabric against the walls of the core. In another embodiment, the upholstery material is wrapped around the free edges of the clamshell core and held in place around the peripheral boundary of the visor by adhesive and by the clamping action of the visor core itself. In this construction, the visor core halves are bonded with the upholstery and material held in place.

In U.S. Pat. No. 4,763,946, a plurality of slots on one side of the core are formed for receiving tabs projecting outwardly from a corresponding mating visor half. A plurality of outwardly projecting pins and corresponding mating recesses formed continuously around the periphery on the opposite visor core half press the edges of the upholstery material and clamp them in a secure position as the visor halves are brought together during manufacture.

The present invention incorporates all of the known benefits of an inner plastic shell while improving the fabric attaching mechanism.

DISCLOSURE OF INVENTION

An object of the present invention is to provide a relatively inexpensive attachment mechanism for securing a sunvisor covering to a plastic shell-type core in an aesthetically pleasing manner.

To obtain the above object and other objects of the present invention in a sunvisor including an inner plastic shell having an upper and lower half and an outer covering having free-edged portions, a trap mechanism is provided for securing the covering on the shell so that the covering is prevented from working loose. The mechanism includes a trap means attached to or integral with an inner surface of a shell half, having one or more members which flex to allow the fabric to enter, but which grabs and maintains tension on the fabric prior to and during closing of the upper and lower shell halves.

Accordingly, an object of the present invention is to provide a relatively inexpensive mechanism for covering a plastic shell-type core with a covering in an aesthetically pleasing fashion to prevent the covering from pulling out or loosening or "bagging" as the shell is closed.

Another object of the present invention is to provide a trap means or plurality of trap means attached to or integral with an inner surface of a shell-half. Also having one or more members which flex to allow the fabric to enter but which grabs and retains the fabric prior to and upon closing the upper and lower shell-halves.

A specific object of the present invention is to provide a method of attaching fabric to a sunvisor having a plastic shell with upper and lower shell halves. First, the fabric and shell halves are placed in a nest, ensuring that the fabric protrudes around the edges of the shell. Next, the fabric is gripped by an implement. The implement then travels inward from the edge of the shell pulling the fabric tight around the edge of the shell. Next, the implement moves toward the inside surface of the shell half while maintaining tension on the fabric. The fabric is then pushed into a trap integral with or attached to the shell half, ensuring the fabric is retained by the trap.

The above object's features and advantages are readily apparent from the following detailed description of the present invention when taken in connection with the accompanying drawings.

BEST MODE FOR CARRYING OUT INVENTION

Figure 1:
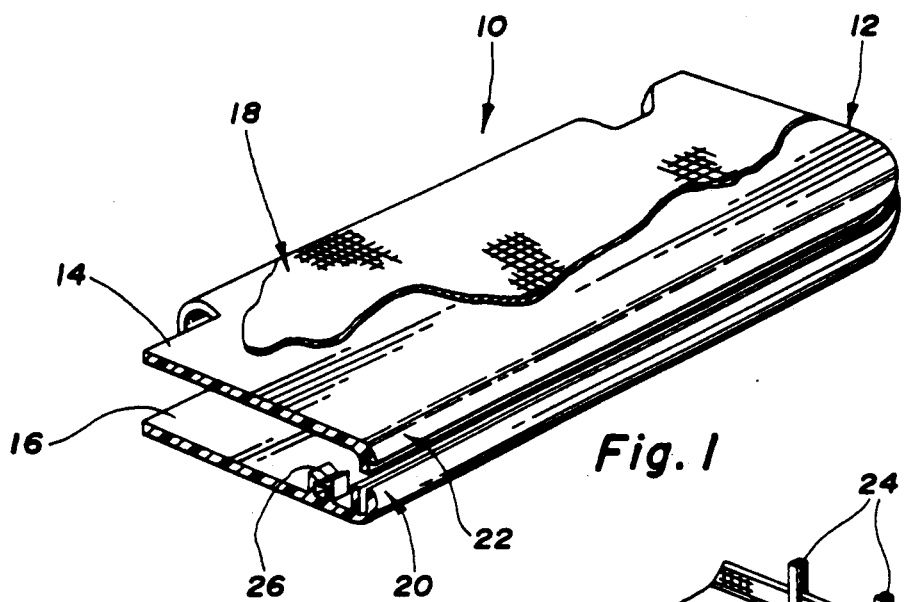
FIG. 1 is a perspective view, partially broken away and in cross-section, of a vehicle sunvisor constructed in accordance with the present invention.
Figure 2:
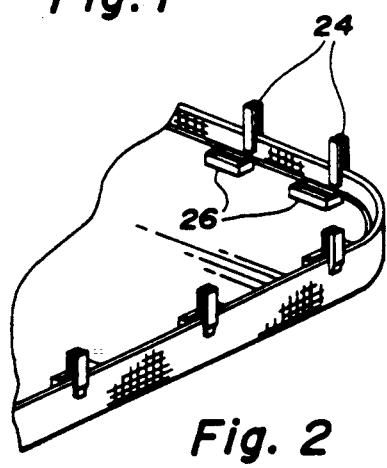
FIG. 2 is a view, partially broken away and in cross-section illustrating the attachment mechanism wherein the trap means are located along the interior surface of a shell-half.

Referring to FIGS. 1 through 10, FIG. 1 illustrates a sunvisor, generally indicated at 10, including an inner plastic shell, generally indicated at 12, having upper and lower shell halves, generally indicated at 14 and 16, respectively.

The sunvisor 10 also includes a covering, generally indicated at 18, the sunvisor 10 having free-edged portions 20 and 22, respectively.

The sunvisor 10 includes a locking mechanism generally indicated at 24 to lock covering 18 in place when the plastic shell 12 is closed. The covering 18 is locked on the shell 12 so that the covering 18 is prevented from working loose during the normal use of the sunvisor 10.

The attachment mechanism in the form of a trap 26 includes one or more flexible members (in this embodiment 28A' and 28B') which allow the covering 18 to enter into the trap 26, but which grabs and retains the covering 18 prior to and upon closing of the upper half 14 and the lower half 16.

Figure 9:
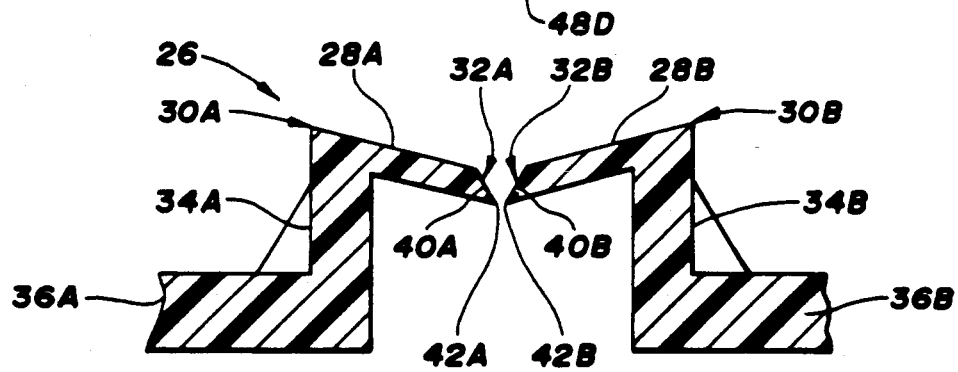
FIG. 9 is a side view of the embodiment illustrated in FIG. 7 or FIG. 10, showing the relationship of the flexible members to one another.

Referring to FIG. 9, each member 28A and 28B has a fixed end 30A and 30B and a free end 32A and 32B. The fixed end 30A and 30B of members 28A and 28B are connected to a support wall or housing 34A and 34B. Each support wall 34A and 34B is connected to a base member 36A and 36B which in turn is fastened or connected to the lower shell half 16. The base members 36A and 36B are perpendicular to the support walls 34A and 34B so as to enhance the stability and ease of securing the trap 26 to the lower shell half 16.

In operation, the free ends 32A and 32B of the flexible members 28A and 28B are forced downward in opposition to each other toward their respective support walls 34A and 34B as the covering 18 is forced into the trap 26 by hand or by an elongated member 38 which assists in pushing the covering 18 into the trap 26. As the elongated implement is removed from the trap, pressure upon the free ends 32A and 32B of flexible members 28A and 28B is slightly released enabling the free ends 32A and 32B of flexible members 28A and 28B to move towards each other thereby grabbing and retaining the covering 18.

The free ends 32A and 32B of the flexible members 28A and 28B have downwardly sloping ends 40A and 40B which form points 42A and 42B which enhance the grabbing and retaining capability of the flexible members 28A and 28B.

Figure 3:
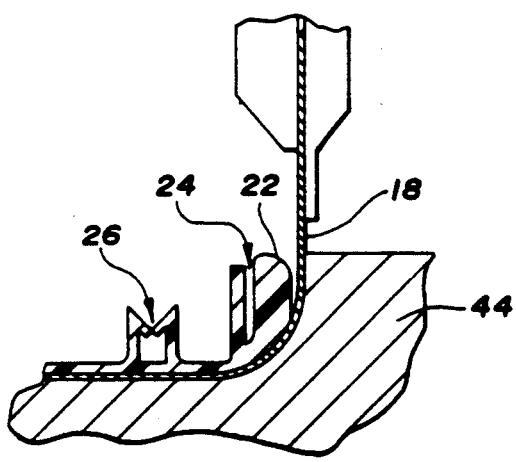
FIG. 3 is an end view, illustrating the fabric as it is wrapped around the free-edged portion of a shell-half.
Figure 4:
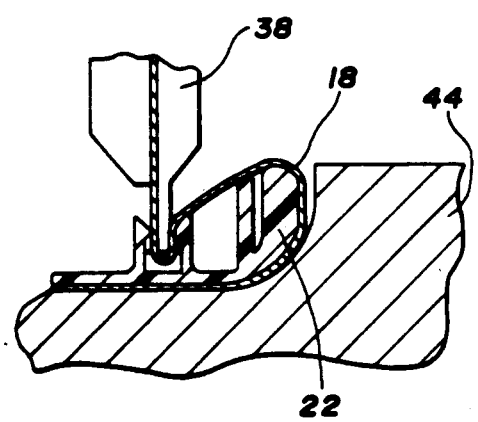
FIG. 4 is an end view similar to that shown in FIG. 3, illustrating the fabric being inserted into a trap means by an elongated implement.
Figure 5:
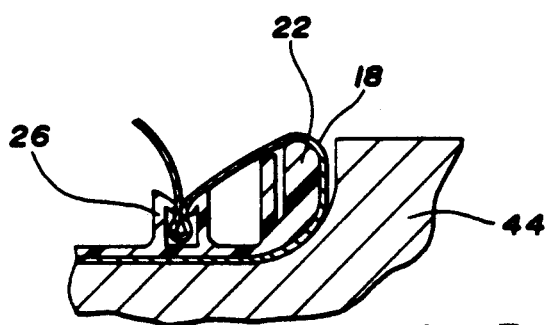
FIG. 5 is an end view similar to that shown in FIG. 3 and FIG. 4, illustrating how the trap means grabs and retains the fabric once the elongated implement is withdrawn.

To attach the covering 18 to the sunvisor 10, the covering 18 is gripped either by hand or by an elongated implement 38 as depicted in FIG. 3 through FIG. 5. The covering 18 and shell halves 14 and 16 were previously placed in a nest 44, ensuring that the covering 18 protrudes beyond the edge 22 of the plastic shell 12.

Referring to FIG. 4, the covering 18 and the elongated implement 38 travel inwardly from the edge 22 of the plastic shell 12 pulling the covering 18 tight around the edge 22 of the plastic shell 12. While moving the covering 18 and the implement 38 toward the inside surface of the lower half 16 of the plastic shell 12, it is important to maintain tension on the covering 18. The covering 18 is then pushed into the trap 26 separating the free ends 32A and 32B of the flexible members 28A and 28B.

Referring to FIG. 5, the elongated implement 38 is removed upon ensuring that the covering 18 is effectively retained by the trap 26 as the free ends 32A and 32B of the flexible members 28A and 28B come together to grab and retain the covering 18.

Figure 6:
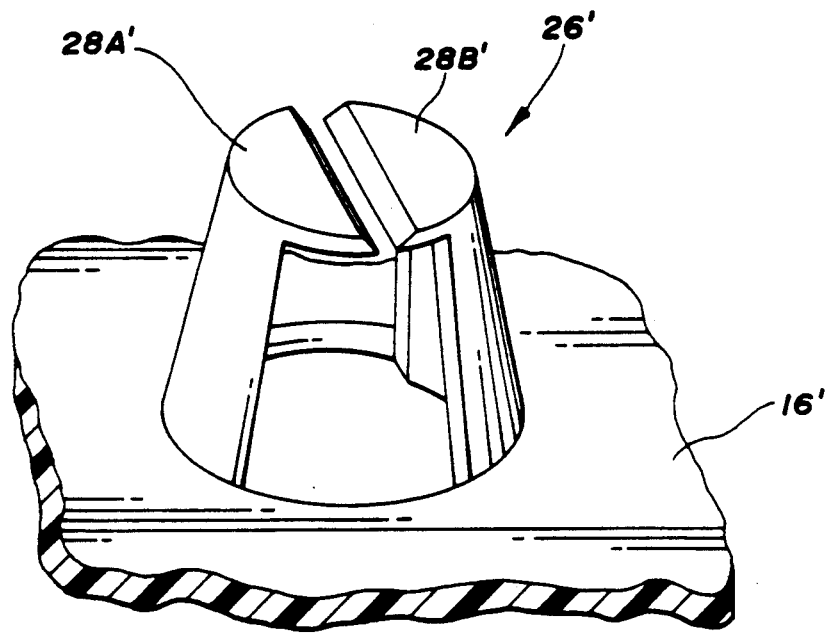
FIG. 6 is a perspective view illustrating one possible embodiment of a trap means constructed in accordance with the present invention.
Figure 7:
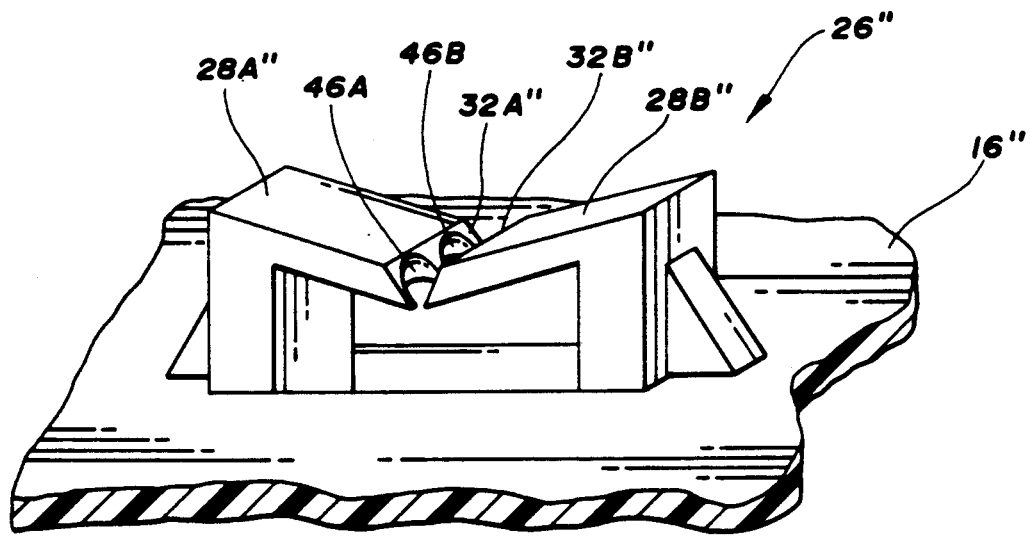
FIG. 7 is a perspective view of an alternative embodiment of a trap means constructed in accordance with the present invention.
Figure 10:
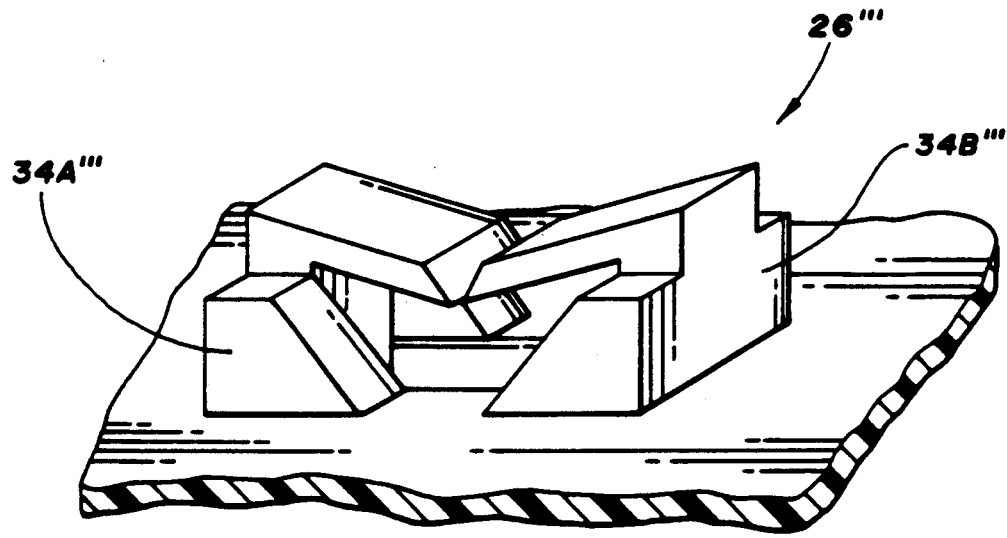
FIG. 10 is a perspective view of an alternative embodiment constructed in accordance with the present invention.

Referring now to FIGS. 6, 7 and 10, depict indicated different embodiments of the trap 26 wherein each different embodiment is given a different prime designation with the same reference numeral indicating the same or similar structure common to the different embodiments.

Figure 8:
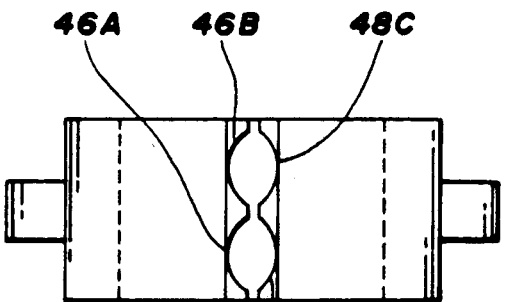
FIG. 8 is a top view of the embodiment illustrated in FIG. 7, constructed in accordance with the present invention.

FIG. 6 illustrates a trap 26' on a lower half 16' having flexible members 28A' and 28B'. FIG. 7 illustrates another embodiment of the trap 26" on a lower half 16" wherein the free ends 32A" and 32B" of the flexible members 28A" and 28B" have a pair of U-shaped cut-outs 46A and 46B which are intended to enhance the grabbing and retention of the covering 18. A top view of the U-shaped cut-outs 46A, 46B, 46C and 46D is shown in FIG. 8.

Finally, referring to FIG. 10, a trap 26''' is shown having an additional width support wall 34A''' and 34B''' which improves and enhances stability of the trap 26'''.

Although the best mode for carrying out the invention has been described in detail, those familiar to the art to which this invention relates will recognize various alternative designs and embodiments for practicing the invention as defined by the following claims.

What is claimed is:

1. An attachment mechanism for use with a sunvisor including a plastic shell having upper and lower halves and an outer covering having free edge portions, for securing the covering on the shell so that the covering is prevented from working loose during assembly, comprising:
   a trap means or plurality of trap means, attached to or integral with an inner surface of a shell half, having one or more members which flex to allow the covering to enter, but which grabs and maintains tension on the covering prior to and upon closing of the upper and lower shell halves.

2. The sunvisor of claim 1 wherein the trap means further comprising one or more flexible members which allows the covering and an elongated implement to enter, but which grabs and retains the covering as the elongated implement is withdrawn.

3. The sunvisor of claim 1 wherein the trap means further comprising a housing cooperating with the one or more flexible members such that the member or members flex with respect to each other and/or the housing to allow the covering to enter the housing and to grab and retain the covering after the covering has entered.

4. The sunvisor of claim 1 wherein the trap means further comprising a fastening means for attaching the trap means to one or more of the shell halves.

5. The method of attaching a covering to a sun visor having a plastic shell with upper and lower shell halves by providing a flexible trap to grab and maintain tension on the covering prior to and upon closing of the upper and lower shell halves.

6. The method of attaching covering to a sunvisor having a plastic shell with upper and lower shell halves comprising the steps of:
   placing the covering and shell halves in a nest, ensuring that the covering protrudes beyond edges of the shell;
   gripping the covering with an implement;
   travelling inwardly from the edge of the shell, pulling the covering tight around the edge of the shell;
   moving the implement toward the inside surface of the shell half while maintaining tension on the covering;

pushing the covering into a trap attached or integral with the inner surface of the shell half, ensuring the covering is effectively retained by the trap;

closing the shell halves.

7. The method of claim 6 wherein the pushing of the covering into the trap is accomplished by means of an elongated implement.

8. The method of claim 6 wherein the trap further comprises one or more flexible members which allows covering to enter but which retains the covering when the elongated implement is withdrawn.

* * * * *